US005438619A

United States Patent [19]

Shannon et al.

[11] Patent Number: 5,438,619

[45] Date of Patent: Aug. 1, 1995

[54] SOLID STATE PRIMARY TELEPHONE PROTECTOR

[75] Inventors: William J. Shannon, Saco; John J. Napiorkowski, Cape Elizabeth; Dan Kidd, Cornish, all of Me.

[73] Assignee: Siecor Puerto Rico, Inc., Hickory, N.C.

[21] Appl. No.: 616,268

[22] Filed: Nov. 20, 1990

[51] Int. Cl.⁶ ........ H02H 9/00

[52] U.S. Cl. ........ 379/412; 379/399; 361/119

[58] Field of Search ........ 379/399, 412, 437; 361/117, 118, 119

[56] References Cited

U.S. PATENT DOCUMENTS 4,613,732 9/1986 Cwirzen et al. ........ 379/412
4,796,150 1/1989 Dickey et al. ........ 361/119
4,881,255 11/1989 Neuwirth et al. ........ 379/412
4,901,188 2/1990 Gilberts ........ 361/119
4,903,295 2/1990 Shannon et al. ........ 379/412
4,924,345 5/1990 Sieman et al. ........ 379/412
4,944,003 7/1990 Meyerhoefer et al. ........ 379/412
4,958,253 7/1990 Gilberts et al. ........ 361/119
4,964,160 10/1990 Traube et al. ........ 361/119 X
5,008,772 4/1991 Neuwirth et al. ........ 361/119
5,031,067 7/1991 Kidd et al. ........ 361/119

*Primary Examiner*—James L. Dwyer
*Assistant Examiner*—Magdy W. Shehata
*Attorney, Agent, or Firm*—J. David Abernethy

[57] ABSTRACT

A telephone protector includes a rigid plastic packaged solid state switch which is clamped to prevent the switch from bursting to an open circuit condition.

4 Claims, 2 Drawing Sheets

SOLID STATE PRIMARY TELEPHONE PROTECTOR

This invention concerns primary telephone protectors. A primary telephone protector is the first protector that a voltage surge from an external source, such as a lightning strike on an external telephone wire, would encounter. The primary telephone protector could be protecting telephone equipment at a subscriber's premises or it could be protecting equipment in a central office. A secondary telephone protector would be located beyond a primary telephone protector. A fault protector for a subscriber line interface circuit (SLIC) is an example of a secondary telephone protector. Primary telephone protectors must be able to withstand higher surges of voltage and/or current than secondary telephone protectors.

This invention is particularly concerned with primary telephone protectors employing solid state switches encapsulated in rigid plastic packages. Such switches are disclosed in U.S. Pat. No. 4,876,713, 4,903,295 and 4,958,254. The switches react rapidly to surge voltages above a predetermined level and shunt the surge current to ground. There is generally a fail-safe mechanism in series with the sold state switch to handle, for example, sustained surges. The fail-safe mechanism could be, for example, a fuse or a heat-and/or-current responsive mechanism of the type commonly used in five pin protector modules, such as disclosed in 4,958,254. It can occur that a surge can be so destructive as to undesirably open circuit the sold state switch before the fail-safe mechanism has time to operate, that is to say, before the fuse opens or before the mechanism in the five pin protector module shorts the surge to ground. This invention is designed to maintain the solid state switch in a closed circuit condition until the fail-safe mechanism has time to become operative.

In this invention, clamping means are placed on the flat sides of a rigid packaged solid state switch to prevent the switch from bursting to an open circuit condition when the switch is subjected to a destructive voltage surge. The clamping means helps maintain the switch in a closed circuit condition long enough to give a fail-safe mechanism in series with the switch enough time to become operative.

A telephone protector in accordance with this invention comprises a cover on an insulative base. The base has an input pin, an output pin and a grounding pin extending therefrom. Within the cover is a grounding member connected to the grounding pin. Also disposed within the cover is a rigid plastic packaged solid state switch having a lead-in wire electrically connected to the input pin and another lead-in wire electrically connected to the grounding member. The solid state switch has a predetermined closing voltage so that a surge voltage at the input pin exceeding the predetermined voltage will be conducted to the grounding member. There are clamping means on the solid state switch to prevent the solid state switch from bursting to an open circuit condition.

Figure 1:
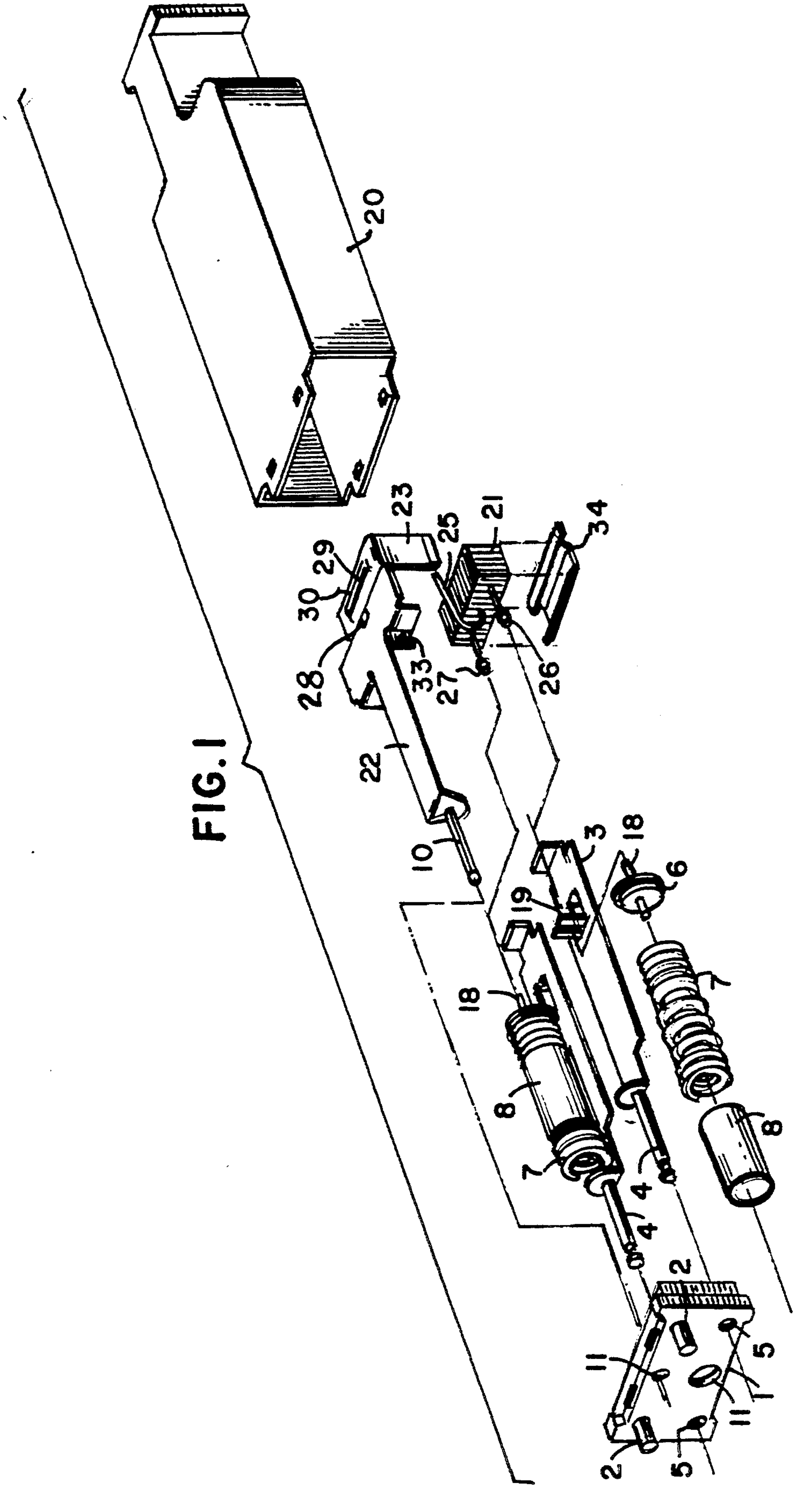
Figure 2:
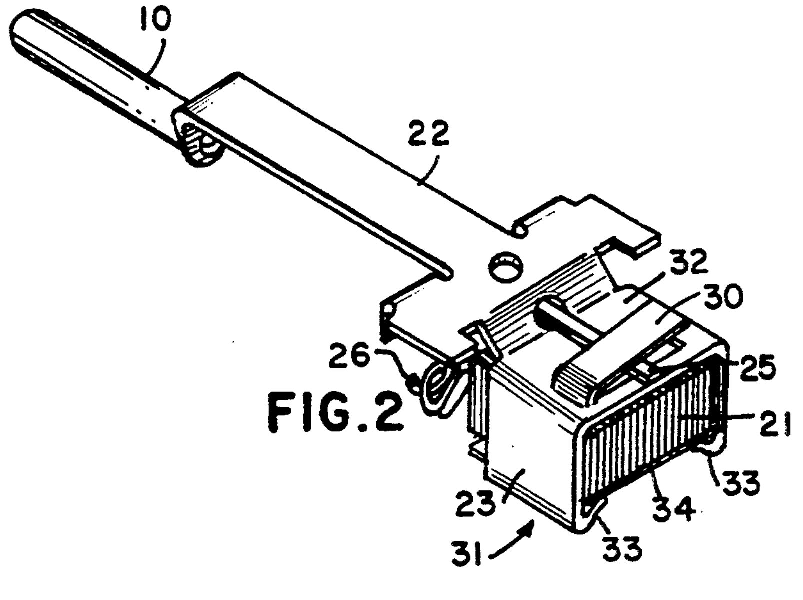
Figure 3:
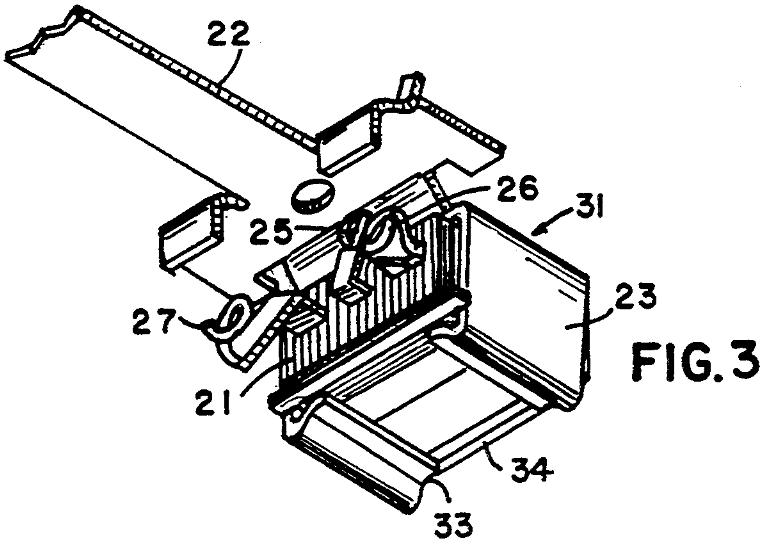
Figure 4:
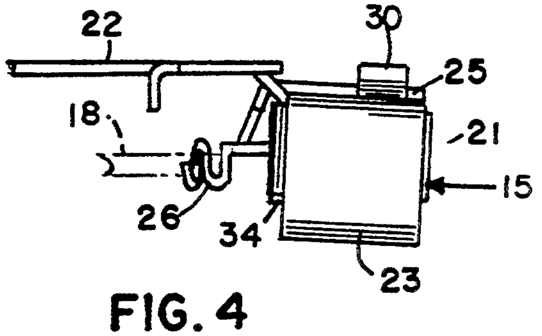

In the drawing, FIG. 1 is an exploded perspective view of one embodiment of a telephone protector in accordance with this invention. FIGS. 2 and 3 show the clamping means on the solid state switch. FIG. 4 shows a method of testing the clamping force.

As shown in FIG. 1, one example of a telephone protector in accordance with this invention comprises an insulative base 1 having two electrically conductive output pins 2 attached thereto. The protector also contains two electrically conductive arms 3 each having an electrically conductive input pin 4 at one end. Pins 4 extend through holes 5 in base 1. Disposed on each arm 3 is a known current- and/or heat-responsive assembly 6 and an electrically conductive spring 7 which may be partially enclosed within a cylindrical plastic sleeve 8.

The protector also contains a grounding member 22 having a grounding pin 10 at one end thereof. Grounding pin 10 extends through hole 11 in base 1. At the other end of grounding member 22 there is a solid state switch 21 contained with clamping means 31. Clamping means 31 consists of vertical sections 23, horizontal member 32 and short horizontal legs, or curls, 33 extending from the bottoms of vertical sections 23, all of which are part of grounding member 22. The remaining part of clamping means 31 is plate 34. The two flat surfaces of rectangular rigid plastic packaged switch 21 are clamped between horizontal member 32 and plate 34. At assembly, curls 33 are pressed against plate 34 to exert a desired amount of clamping force on the flat surfaces of switch 21.

Switch 21 has three lead-in wires, 25, 26, 27, protruding therefrom. The ends of lead-in wires 26 and 27 are helically coiled so that metal pins 18, which protrude from assembly 6, fit inside and make electrical and physical contact therewith. Lead-in wire 25 is grounded to grounding member 22 by being bent back, extending through hole 28 in grounding member 22, and being held in slot 29 of horizontal member 32 by binding finger 30. The protector is contained within standard size cover 20.

In normal operation electrical current flow is from input pin 4 to electrically conductive arm 3, through raised tab 19 to metal pin 18, through current responsive assembly 6 to spring 7 to output pin 2. As known, current responsive assembly 6 is designed to electrically connect input pin 4 to grounding pin 10 when current responsive assembly 6 attains a predetermined temperature, say 90° C., due either to resistive heating or to overheating of switch 21.

During normal operation, switch 21 is open. However when a surge of sufficient magnitude, say, 290 volts, appears across switch 21, either from lead-in wire 26 or 27, switch 21 closes and places the respective metal pin 18 in electrical contact with grounding pin 10 through lead-in wire 27 which is grounded. This prevents the surge voltage from reaching the respective output pin 2.

At assembly of clamping means 31, switch 21 is placed between vertical sections 25 with one flat side of switch 51 against horizontal member 52. Plate 54 is placed against the other flat side of switch 51 and about ten pounds of force are applied to curls 35 to press plate 54 against said flat side of switch 51. The degree of clamping can be tested, as shown in FIG. 4, by applying a lateral force 15 against switch 21. In this embodiment, switch 21 is required to withstand a lateral force of at least four pounds without sliding.

We claim:

1. A telephone protector comprising: a cover on an insulative base, the insulative base having an input pin, an output pin and a grounding pin all extending therefrom; a grounding member disposed within the cover and connected to the grounding pin; a rigid plastic packaged solid state switch disposed within the cover, the solid state switch having a lead-in wire electrically connected to the input pin and having another lead-in wire electrically connected to the grounding member; the solid state switch having a predetermined closing voltage so that a surge voltage at the input pin exceeding said predetermined voltage will be conducted to the grounding member; and clamping means on the solid state switch to prevent the solid state switch from bursting to an open circuit condition, said clamping means consisting of the grounding member and a clamping plate and further includes a horizontal member portion of the grounding member, two vertical sections extending from the grounding member and curls extending horizontally from the bottoms of the vertical sections.

2. The telephone protector of claim 1 wherein the rigid plastic packaged solid state switch has two flat sides and wherein the clamping means are clamped against the two flat sides.

3. The telephone protector of claim 1 wherein the solid state switch is clamped sufficiently to withstand a four pound lateral force without sliding.

4. The telephone protector of claim 1 wherein the clamping means is pressed against a flat surface of the solid state switch by means of the curls being pressed against the clamping plate.

* * * * *